US012742355B2

(12) United States Patent
Clery et al.

(10) Patent No.: US 12,742,355 B2
(45) Date of Patent: Sep. 22, 2026

(54) METHOD FOR ADJUSTING A SYSTEM HAVING A MOTORIZED WINDABLE ELEMENT AND SYSTEM HAVING A MOTORIZED WINDABLE ELEMENT IMPLEMENTING SAID METHOD

(71) Applicant: SOMFY ACTIVITES SA, Cluses (FR)

(72) Inventors: Sébastien Clery, Cluses (FR); Laura Nessi, Cluses (FR); Ghislain Measson, Cluses (FR); Arnaud Rebuffat, Cluses (FR)

(73) Assignee: Somfy Activites SA, Cluses (FR)

(*) Notice: Subject to any disclaimer, the term of this patent is extended or adjusted under 35 U.S.C. 154(b) by 215 days.

(21) Appl. No.: 18/575,943

(22) PCT Filed: Jul. 7, 2022

(86) PCT No.: PCT/EP2022/068896
§ 371 (c)(1),
(2) Date: Jan. 2, 2024

(87) PCT Pub. No.: WO2023/280975
PCT Pub. Date: Jan. 12, 2023

(65) Prior Publication Data

US 2024/0337153 A1 Oct. 10, 2024

(30) Foreign Application Priority Data

Jul. 8, 2021 (FR) ....................................... 2107416

(51) Int. Cl.

| | |
|---|---|
| ***E06B 9/72*** | (2006.01) |
| ***E06B 9/42*** | (2006.01) |
| *E06B 9/68* | (2006.01) |

(52) U.S. Cl.
CPC .................. *E06B 9/72* (2013.01); *E06B 9/42* (2013.01); *E06B 2009/6845* (2013.01); *E06B 2009/6854* (2013.01); *E06B 2009/6872* (2013.01)

(58) Field of Classification Search
CPC ..... E06B 9/72; E06B 9/88; E06B 9/42; E06B 2009/6845; E06B 2009/6854; E06B 2009/6872
See application file for complete search history.

(56) References Cited

U.S. PATENT DOCUMENTS 7,445,035 B2 * 11/2008 Bruno .................. G05B 19/425 160/310
10,174,553 B2 * 1/2019 Mugnier ................... E06B 9/15
(Continued)

FOREIGN PATENT DOCUMENTS

| | | |
|---|---|---|
| EP | 0951610 | 10/1999 |
| EP | 2075401 | 7/2009 |
| WO | 9829635 | 7/1998 |

OTHER PUBLICATIONS

International Search Report a for PCT/EP2022/068896, dated Oct. 17, 2022.

*Primary Examiner* — Beth A Aubrey
(74) *Attorney, Agent, or Firm* — Wissing Miller LLP

(57) ABSTRACT

The invention relates to a method for adjusting a system having a motorized windable element, comprising: a windable element; winding tube (5) onto which said windable element can be wound; an actuator for operating the windable element which is movable in a first direction of rotation for unwinding the windable element and in a second direction of rotation for winding the windable element; and an electronic control unit comprising a means for tracking the position of the windable element, said windable element being configured to reach a high position and a low position
(Continued)

(P2). The method according to the invention is characterised in that it comprises a step of tracking a replacement position (P3) of the windable element, in which the windable element is completely.

17 Claims, 3 Drawing Sheets

(56) References Cited

U.S. PATENT DOCUMENTS 11,384,600 B2 * 7/2022 Rivera ...................... E06B 9/72
2009/0165779 A1 7/2009 Hoff

* cited by examiner

METHOD FOR ADJUSTING A SYSTEM HAVING A MOTORIZED WINDABLE ELEMENT AND SYSTEM HAVING A MOTORIZED WINDABLE ELEMENT IMPLEMENTING SAID METHOD

This application is a 371 of PCT/EP2022/068896, filed on Jul. 7, 2022, published on Jan. 12, 2023, under publication number WO 2023/280975, which claims priority benefits from French Patent Application No. FR2107416, filed on Jul. 8, 2021, the disclosure of each of which are incorporated herein by reference.

TECHNICAL FIELD

The present invention relates to a method for adjusting a system having a motorized windable element, as well as to a motorized windable element able to implement the method according to the invention.

BACKGROUND OF THE INVENTION

The systems having motorized windable elements generally comprise a movable screen comprising a windable element, such as an apron formed from articulated slats or a fabric, windable by means of a motorized windable element operating actuator, allowing the windable element to be wound around a winding tube, in particular a winding tube in which the actuator is housed. This is usually located in the upper part of the system.

By activating the motorized operating actuator, the windable element is displaced between a high position, according to which the windable element is wound onto the winding tube so as to leave an opening in the building uncovered, that is, substantially completely wound onto the winding tube, and a low position, according to which the windable element is unwound so as to completely cover the opening. The unwinding of the screen is linked to the torque supplied by the actuator as well as the weight of a load bar forming part of the screen and attached to the windable element. The weight of the load bar is able to naturally drive the windable element toward the low position as the screen unwinds.

The motorized operating actuator comprises an electronic control unit able to receive commands from a user by means of a control interface such as a remote control, a wall interface or a control application.

When the system is installed on the premises of the user, an installer identifies the various positions to be reached by the windable element. These positions are positions reached by the load bar relative to the opening and correspond to the angular positions assumed by the winding tube, which can rotate over several revolutions.

Typically, the installer identifies the high and low positions, defining end-of-travel positions, depending on the size of the opening to be masked and the positioning of the system relative to the opening to be masked.

When the windable element is an assembly comprising a fabric and a load bar, the fabric is generally wound by at least one dead turn or several dead turns around the winding tube, in particular so as not to reveal the unsightly bare winding tube when the fabric is in its lowered position. This is made possible by appropriate fabric sizing, in particular by increasing the fabric length beyond that strictly necessary to cover the opening to be masked.

Thus, when the installer adjusts the location of the high and low positions, this setting is adapted to the number of dead turns of the fabric on the winding tube, which varies from one system to another.

The fabric is typically mounted on the winding tube by providing an attachment area between the fabric and the winding tube.

For this purpose, the fabric includes at its upper end a bar extending across the entire width of the fabric, slid into a corresponding slide or groove in the winding tube. As a variant, the fabric can be clipped into the groove. As a variant, the fabric can be glued to the tube.

Other ways of mounting the fabric relative to the tube are possible, for example by using a technical strip to ensure the connection on one hand the fabric to the tube on the other by any suitable means.

During the lifetime of such a system, it may be necessary to replace the fabric, either following damage, or in order to modify the overall aesthetics of the system. In the case of a technical strip, this can be considered to be associated with the fabric or the tube, according to whether only the aesthetic fabric is to be changed or the fabric and technical strip together.

In order to access the attachment area between the fabric and the winding tube, the fabric must be unwound in its entirety, including the dead turn(s).

In the first case, the fabric is replaced by dismantling the system, in particular the winding tube. The fabric is then completely unwound, to gain access to the attachment area between the fabric and the winding tube, replaced, and the system reassembled.

In a second case, one may seek to replace the fabric without dismantling the winding tube.

Thus, the fabric must be unwound beyond its low position in order to unwind the dead turn(s).

However, insofar as the low position is programmed as the end-of-travel position, the actuator is not allowed to drive the fabric beyond this low position.

Thus, when it comes to replacing the fabric in a system, it is currently necessary to de-program at least the low position in order to allow displacement beyond it.

In either case, this fabric replacement operation is complex for a user to implement, and recourse to an installer is often necessary.

The present invention aims to overcome the above disadvantages, and to this end relates to a method for adjusting a system having a motorized windable element, said system comprising:

- a windable element,
- a winding tube, onto which said windable element can be wound,
- an actuator for operating the windable element, comprising an electric motor, movable in a first direction of rotation according to which the windable element is displaced at least in an unwinding direction, and in a second direction of rotation according to which the windable element is displaced at least in a windable direction,
- an electronic control unit comprising means for tracking the position of the windable element,
- said windable element being configured to reach a high position and a low position located beyond said high position in the unwinding direction of the windable element, the windable element being wound at least partially around the winding tube in the low position,
- said method being remarkable in that it comprises a step in which the means for tracking the position of the windable element locates a single position called the windable element replacement position, according to which the windable element is completely unwound relative to the winding tube.

The method according to the invention allows the fabric to be positioned in the fabric replacement position. Thanks to the present invention, it is possible to automatically locate and therefore position the windable element in a position suitable for the windable element replacement, while avoiding having to dismantle the system or having to delete the programming of the low position in order to reach the windable element replacement position.

In a very advantageous manner, the method includes a step for recording the unique position, so that the windable element can be brought into this unique position by sending a command to the electronic unit by means of a control interface to allow the windable element to be changed.

By avoiding the need to dismantle the system or to delete the programming of the low position to reach the windable element replacement position, the presence of an installer to replace the windable element is no longer required.

Consequently, this simplifies the replacement of the windable element in a system.

According to optional features of the method for adjusting according to the invention:

- the electronic control unit comprises means for determining a parameter representative of the position of the windable element and means for monitoring a parameter representative of the torque of said electric motor, and the method includes the following steps:
- drive the electric motor in rotation in its first direction of rotation;
- analyze the variations in at least one of the parameters when the electric motor is driven in rotation in its first direction of rotation;
- determine, from said analysis, a minimum value for the analyzed parameter;
- locate the position of the windable element when said minimum value of the analyzed parameter is reached, said position corresponding to said position of replacement of the windable element;
- the means for determining a parameter representative of the position of the windable element is part of the means for tracking the position of the windable element;
- the step aimed at determining the minimum value of the parameter is carried out by the electronic control unit when it detects, during the step aimed at driving the electric motor in rotation in its first direction of rotation, a reduction in the parameter followed by an increase in the parameter;
- the analyzed parameter can be the parameter representative of the torque supplied by the motor;
- as a variant, the analyzed parameter may be the parameter representative of the position, in particular the position assumed by a free end of the windable element;
- the method may comprise a step aiming to control the rotation of the electric motor until said minimum value of the analyzed parameter is reached, and a step aiming to stop the rotation of the electric motor when said minimum value of the analyzed parameter is reached, the step aiming to control the rotation of the electric motor until the minimum value of the analyzed parameter is reached being carried out by driving the electric motor in rotation at least in its second direction of rotation;
- the method can include, subsequent to the step aiming to stop the rotation of the electric motor when the position of the replacement of the windable element is reached, a step aiming to propose to the user to modify the position of the windable element relative to said position of replacement of the windable element reached;
- in one embodiment, the method includes a further step aiming to memorize the tracked position of replacement of the windable element;
- the windable element replacement position can be located beyond the low position in the unwinding direction of the windable element;
- in one embodiment, the windable element includes a fabric equipped with a load bar and the means for determining the position of the windable element includes an angular position encoder or a time counter, and the method includes a step for determining, when the electric motor is driven in rotation in its first direction of rotation, a first position in which the load bar of the windable element rests on an obstacle and a second position in which said load bar is raised from said obstacle;
- the method may include the following steps with the aim of:
- counting the number of pulses generated by the angular position encoder or the time counter between the first position and the second position;
- tracking the position of replacement of the windable element by dividing by two the number of pulses counted.

The present invention also relates to a system having a motorized windable element, said system comprising:

- a windable element,
- a winding tube, onto which said windable element is likely to be wound,
- an actuator for operating the windable element, comprising an electric motor, movable in a first direction of rotation according to which the windable element is displaced in at least one unwinding direction, and in a second direction of rotation according to which the windable element is displaced in at least one winding direction,
- an electronic control unit, comprising means for tracking the position of the windable element, said windable element being configured to reach a high position and a low position located beyond said high position in the unwinding direction of the windable element, the windable element being wound at least partially around the winding tube in the low position, remarkable in that it comprises hardware and/or software means for implementing the method for adjusting according to the invention.

According to optional features of the system according to the invention:

- the electronic control unit comprises means for determining a parameter representative of the position of the windable element and means for monitoring a parameter representative of the torque of said electric motor;
- the system having a motorized windable element comprises an angular position encoder and/or a time counter.

The system can be such that the control unit is configured to place the windable element in the position of replacement of the windable element following receipt of a command from a user by means of a control interface.

Another subject-matter of the present invention is a method for replacing a windable element of a system according to the invention including:

a) Sending a command by means of the control interface to bring the windable element into the position of replacement of the windable element, b) Removing the windable element, c) Placing a new windable element on the winding tube.

BRIEF DESCRIPTION OF THE DRAWINGS

Further features, aims and advantages of the invention will become apparent from reading the following detailed description, for the understanding of which reference is made to the appended drawings in which.

DETAILED DESCRIPTION OF THE INVENTION

Throughout the figures, identical or similar references represent identical or similar components or assemblies of components.

Figure 1:
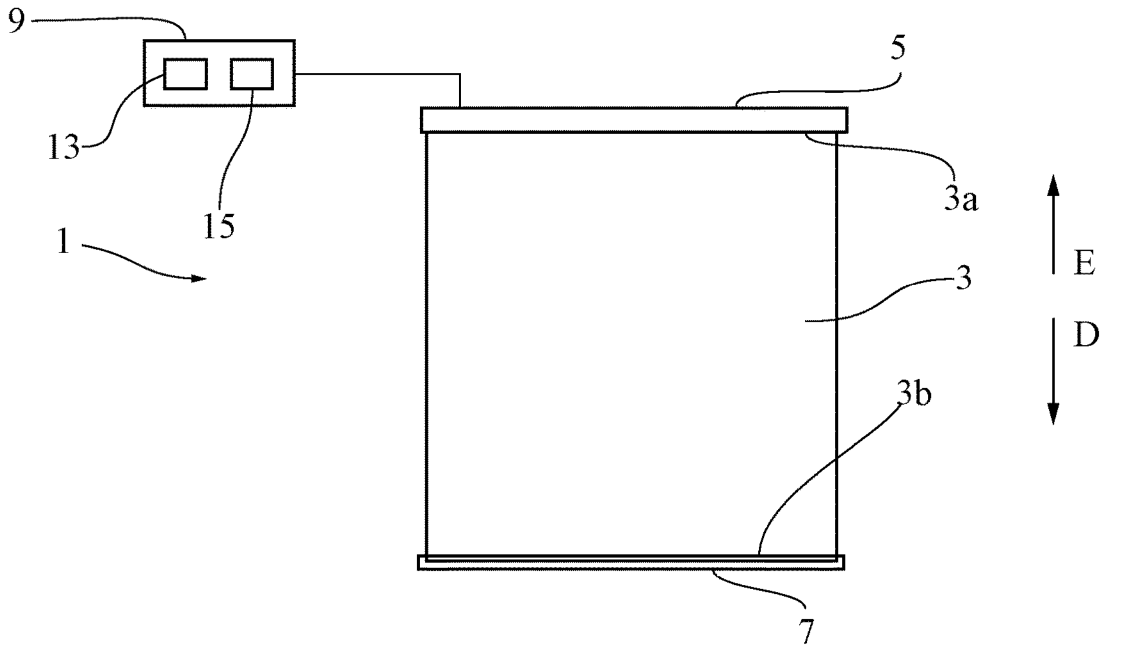
FIG. 1 is a front view of a system having a motorized windable element according to the invention.

Reference is made to FIG. 1 illustrating a system 1 for a motorized windable element in the closed position, or low position.

The system 1 comprises a closing, screening or sun protection screen comprising a windable element such as an awning fabric 3.

The fabric 3 is connected, at one of its ends, the so-called upper end 3*a*, to a winding tube 5. The fabric 3 winds up on the winding tube 5 and on itself and unwinds relative to the winding tube 5, the unwound part then being freely suspended vertically or guided substantially vertically by guides (not shown).

The connection between the upper end 3*a* of the fabric 3 and the winding tube 5 is obtained, for example, by providing an attachment area including a bar extending generally over the entire width of the fabric 3, slid into a corresponding slide or groove provided in the winding tube 5. As a variant, the fabric 3 can be clipped into the groove. As a variant, the fabric 3 can be fixed to the winding tube 5 by any other means, in particular by gluing the fabric 3 to the winding tube 5 or indirectly, by means of a technical strip.

At the other free end of the fabric 3, known as the lower end 3*b*, a load bar 7, in particular a weighted bar, is mounted.

The fabric 3 is intended to conceal an opening 8 (visible as a dotted line in FIG. 2A) when in its low position. In such a low position, the closing, shading or solar protection screen, in particular the fabric 3, completely covers the corresponding opening 8 to be masked.

The displacements of the fabric 3 are controlled by the displacement in rotation of the winding tube 5, the drive of which, for example, is ensured by means of an electromechanical operating actuator comprising, for example, a tubular geared motor assembly (not shown) arranged inside the winding tube 5.

The geared motor assembly comprises a motor and a gearbox, in particular an epicyclic gearbox. The motor may be a DC motor with rotor and brushes, a brushless DC motor with electronic commutation or an asynchronous motor. The actuator may also comprise a brake.

The actuator also comprises an electronic control unit 9 able to receive commands from a user by means of a control interface 11, such as a remote control, a wall interface or a control application installed on a mobile terminal. The control interface 11 can be connected to the electronic control unit 9 by wired or wireless communication means, such as radio waves or infrared rays. The motor of the operating actuator is controlled by the electronic control unit 9, in particular as a function of the commands received.

The fabric 3 can be displaced according to a first direction of displacement, known as the unwinding direction, toward the low part of the system, as illustrated by arrow D in FIG. 1, and in a second direction of displacement, opposite to the first direction of displacement, known as the winding direction, toward the high part, as illustrated by arrow E in FIG. 1. The first direction of displacement and the second direction of displacement refer in particular to the main travel of the movable element between the high and low positions.

The unwinding of the fabric 3 is obtained by driving the electric motor of the operating actuator in rotation in a first direction of rotation, while winding of the fabric 3 is obtained by driving the electric motor of the operating actuator in rotation in a second direction of rotation.

The electronic control unit 9 comprises hardware and/or software means 13 for implementing the method for adjusting of the invention. In particular, the electronic control unit 9 comprises a means for tracking the position of the windable element.

According to one embodiment of the invention, the electronic control unit 9 may also comprise a means for determining a parameter representative of the position of the windable element and a means for monitoring a parameter representative of the torque of the electric motor. The electric motor torque is the torque supplied by the motor to wind or unwind the windable element, in particular to overcome the resisting torques associated with the gearbox, brake and/or windable element.

According to one embodiment of the invention, the means for determining a parameter representative of the position of the windable element is part of the means for tracking the position of the windable element.

Such a means of determining a parameter representative of the position of the windable element may preferably include, for example, a position encoder comprising, for example, an assembly of a magnetic sensor, such as a Hall-effect sensor, and a magnetized wheel rotating with the motor. The position encoder allows the passages of the different poles of the magnetized wheel in front of the magnetic sensor to be identified and a corresponding rotation of the winding tube to be deduced therefrom.

As a variant, the means for determining a parameter representative of the position of the windable element may comprise an optical sensor positioned in the system so as to detect that the fabric 3 is no longer wound at least partially on the winding tube 5. Thus, when the optical sensor points at the bare winding tube, this means that the fabric 3 is completely unwound.

As a variant, the means for determining a parameter representative of the position of the windable element may include an accelerometer positioned on the load bar 7 at the bottom of the fabric 3, depending on the direction of displacement, toward the bottom, or toward the top of the fabric 3.

When the electric motor is of the brush-and-collector DC or electronically commutated DC type, and when the parameter analyzed is the parameter representative of the torque supplied by the motor, the parameter representative of the torque being monitored is the current. When the electric motor is an asynchronous motor, the parameter representative of the torque being monitored is the variation in the voltage.

The electronic control unit 9 also includes a processing unit 15, in particular able to analyze the variations in the monitored parameter.

Figure 2A:
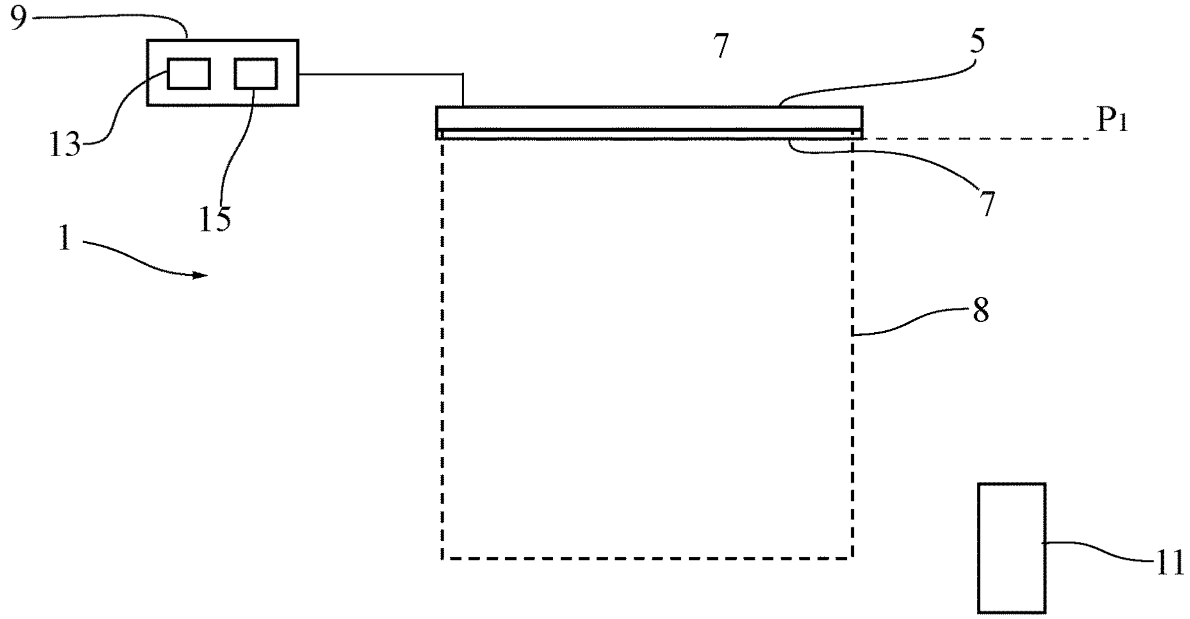
FIG. 2A illustrates the system in the open position.
Figure 2B:
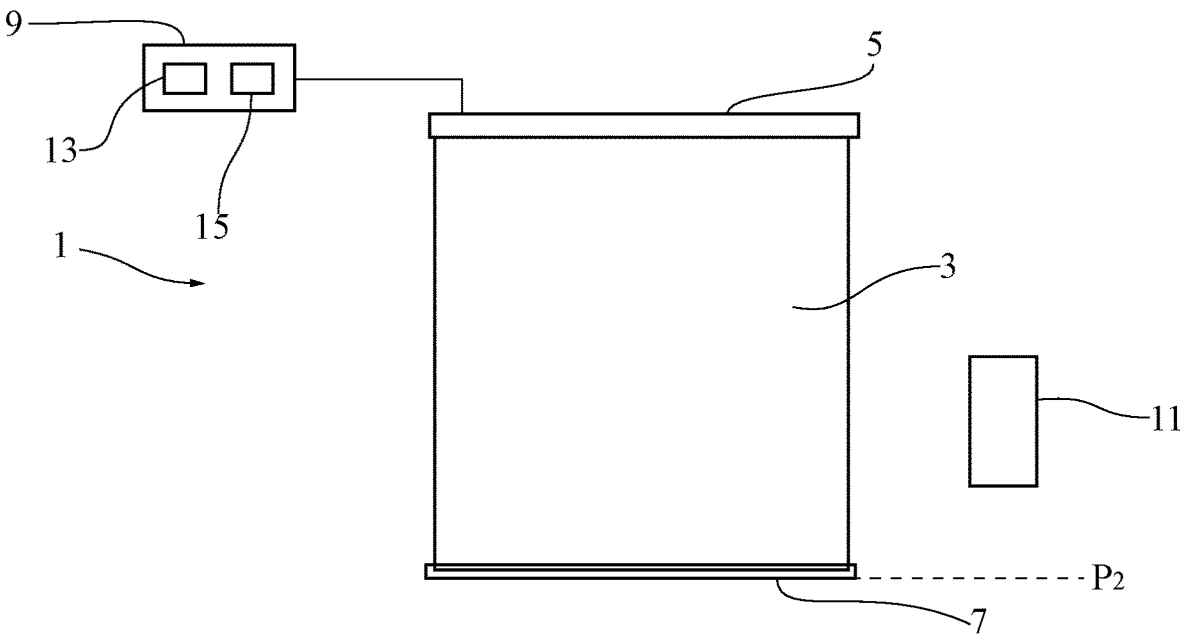
FIG. 2B illustrates the system in the closed position.

Reference is made to FIGS. 2A and 2B, which illustrate the system 1 in the open position, or high position, and in the closed position, or low position, respectively.

The load bar 7 is movable between a position P1 corresponding to an open or high position, according to which the fabric 3 is fully wound onto the winding tube 5, uncovering the opening 8, and a position P2 corresponding to a closed or low position, in which the fabric 3 is unwound, fully covering the opening 8.

In the low position P2, the fabric 3 is wound at least partially around the winding tube 5. Thus, in the low position P2, the load bar 7 is suspended from the fabric 3 or, when the opening 8 to be masked includes a horizontal ledge at its lower edge, such as a shelf or even the floor in the case of a bay window, the load bar 7 rests against the ledge.

The positions P1 and P2 are identified in a known way, for example when the system 1 is installed on the premises of the user, by an installer.

The installer identifies the high position P1 and the low position P2, depending on the size of the opening 8 to be masked and the position of the system relative to the opening 8 to be masked.

Conventionally, in the low position, the fabric 3 is preferably still wound around the winding tube 5 by one or more dead turns. Thus, the unfurled and visible fabric 3 is not the part of the fabric directly in contact with the winding tube 5, which could be more marked by surface imperfections of the winding tube 5 or by the junction line between the fabric 3 and the winding tube 5. Also, allowing to provide one or more dead turns when calculating the size of the fabric prior to installation allows that the unsightly bare winding tube 5 is not visible when the fabric 3 is in its low position P1.

Figure 3:
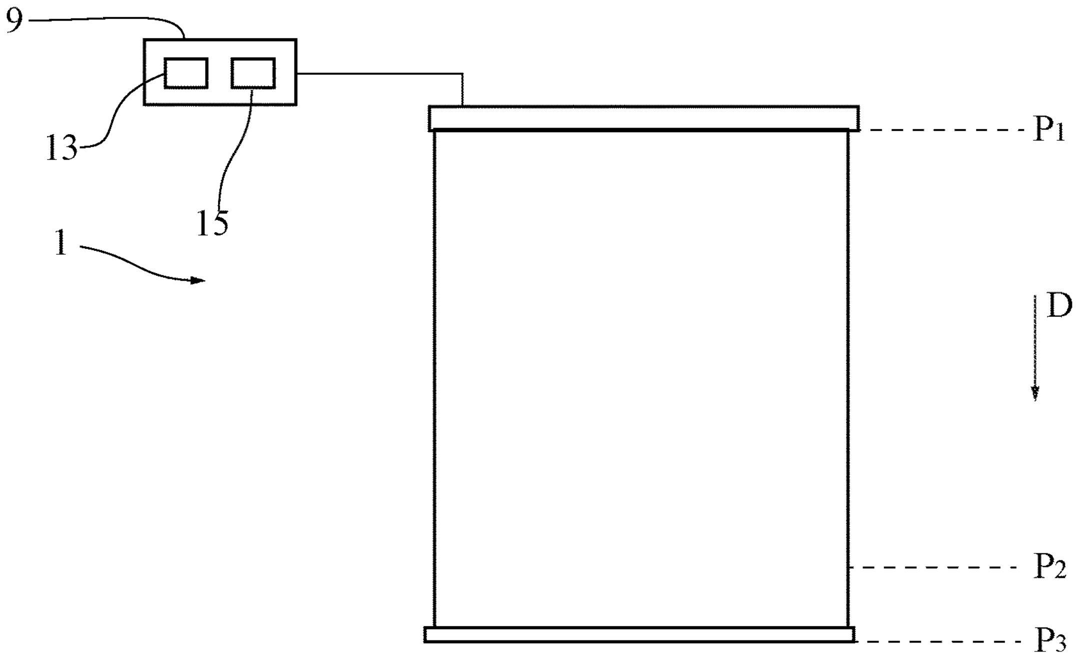
FIG. 3 shows the various positions reached by the system when implementing the method for adjusting of the invention.

As illustrated in FIG. 3, the method for adjusting the system 1 allows the displacement of the load bar 7 of the fabric 3 to be controlled to a single position P3, the so-called fabric replacement position, which must be reached when the user wishes to replace the fabric 3 (and load bar 7) with another fabric (and load bar).

The fabric replacement position P3 is located beyond the position P2 in the unwinding direction of fabric 3, that is, lower than position P2.

Indeed, the replacement position P3 of the fabric corresponds to a position in which the fabric 3 is completely unwound, with no dead turns, unlike the low position P2, where the aim is to retain the presence of the dead turn(s) on the winding tube 5.

The distance between positions P2 and P3 is therefore equal to the length of the fabric 3 wound onto the winding tube 5 used to produce the dead turn(s).

When the load bar 7 of the fabric 3 reaches the fabric replacement position P3, the attachment area between the fabric 3 and the winding tube 5 is accessible. This allows the fabric 3 to be removed from the winding tube, for example, by releasing the load bar of the fabric 3 from the corresponding slot or groove in the winding tube 5.

The method according to the invention comprises a step in which the means for tracking the position of the windable element tracks the single position P3 for replacement of the fabric 3, according to which the fabric 3 is completely unwound from the winding tube 5.

The method for adjusting according to the invention can be implemented, for example, by an operator in the factory, when setting up the system 1. To do this, an operator manually detects, for example visually, the fabric replacement position P3, according to which the fabric 3 is completely unwound relative to the winding tube 5, by varying the position of the screen up to this position P3. The tracking means tracks the successive positions taken by the screen and the position P3 indicated by the installer. The electronic control unit is equipped with memory means, allowing the replacement position P3 of the tracked screen 3 to be memorized, so that this position can be recalled later by a user when the screen needs to be changed.

The method according to the invention can be initiated by means of the control interface 11. When it corresponds to a remote control or a wall interface, the control interface 11 comprises, for example, two keys which allow a user to command a displacement of the fabric 3 in its winding direction or in its unwinding direction respectively. A combination of keys or a specific key allows to displace the motorized screen to its fabric replacement position P3 and tracking it. The tracking can also take place in the absence of movement for a predefined period during a fabric replacement position search step. When the control interface 11 is a mobile terminal, a pre-installed control application triggers the method for adjusting the invention. The control interface 11 sends a corresponding command to the operating actuator, which displaces the fabric 3 so as to track the fabric replacement position P3.

According to the invention, the parameter analyzed can be, according to a first variant, the parameter representative of the position, in particular the position assumed by a free end of the fabric 3 or, according to a second variant, the parameter representative of the torque supplied by the motor.

Figure 4:
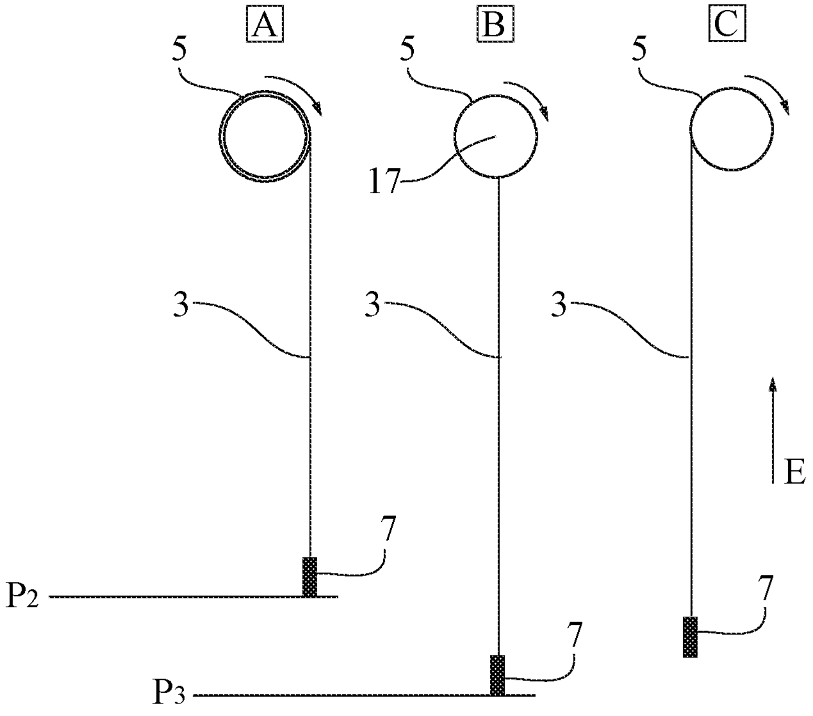
FIG. 4 schematically represents the operational steps of the method for adjusting of the invention.

Reference is now made to FIG. 4 to describe a procedure for carrying out the method for adjusting according to the invention when the parameter analyzed is the parameter representative of the torque supplied by the motor.

According to a first step E1 of the method for adjusting the invention, the electric motor of the actuator for operating the fabric 3 is driven in rotation in its first direction of rotation, according to which the fabric 3 is displaced in the conventional operating situation in the direction of unwinding D, toward the bottom of the system (phase A represented in FIG. 4).

According to a second step E2, the torque variations of the electric motor are analyzed, in particular by monitoring the current variations when the electric motor is of the brush-and-collector DC type or electronically commutated DC type, or by monitoring the voltage variations when the electric motor is an asynchronous motor.

The torque variations observed during this downward movement correspond to the weight variations of the fabric 3 and the load bar 7 suspended from the winding tube 5. During the unwinding of the fabric 3, the weight of the fabric 3 and the load bar 7 drives the electric motor. As a result, the torque is reduced during this unwinding phase.

The unwinding of the fabric 3 is continued, keeping the motor turning in its first direction of rotation. The load bar 7 of the fabric 3 passes the low position P2 until the fabric 3 is fully unwound, in other words, the dead turn(s) are completely unwound.

The unwinding of the fabric 3 relative to the winding tube 5, modifies, on the last dead turn, the position of the junction between the fabric 3 and the winding tube 5, relative to the axis 17 of the winding tube 5. In the position illustrated in phase B of FIG. 4, the fabric 3 is completely unwound and aligned with the axis 17 of the winding tube 5.

This position corresponds to the fabric replacement position P3. When the fabric 3 is completely unwound, the torque required from the electric motor is minimal.

At this point, the motor is still rotating in its first direction of rotation, allowing the fabric 3 to be unwound.

Given that the fabric 3 is completely unwound, the continued rotation of the actuator motor in its first direction of rotation forces the fabric 3 to rewind onto the winding tube 5, in the opposite direction.

At this point, when the fabric 3 begins to rewind on the winding tube 5, the weight of the fabric 3 and the load bar 7 to be driven is transmitted to the winding tube 5. The electric motor is then no longer driven by the fabric 3. Instead, it has to exert a force to rewind the fabric 3 onto the winding tube 5. Thus, the torque required from the electric motor increases again (phase C in FIG. 4).

According to step E3, the electronic control unit 9 determines, from the torque analysis just performed, the minimum torque value, representative of the fabric replacement position P3.

This value is identifiable when the torque monitoring means of the electronic control unit 9 detects, during the step according to which the electric motor is driven in rotation in its first direction of rotation, a reduction in motor torque followed by an increase in torque. In particular, this value is identifiable when it is detected over a range of positions beyond the low position in the unwinding direction.

According to a step E10, the position of the windable element when the minimum torque value is reached is identified, said value being representative of a windable element replacement position.

According to step E4, the electric motor is rotated until the minimum torque value identified in step E10 is reached.

Indeed, the tracking of the fabric replacement position P3 may occur during the displacement of the fabric, the position may be exceeded. To do this, the electric motor is first, driven in rotation in its second direction of rotation, according to which the fabric 3 is displaced in conventional operating conditions in the winding direction E. The fabric 3 being wound, partially, on the winding tube 5 in the opposite direction after having passed the position P3, the fabric 3 initiates an unwinding phase.

The electronic control unit 9 monitors the torque supplied by the electric motor during the unwinding phase of step E4, corresponding to rotation of the motor in its second direction of rotation. This monitoring can be used to refine the tracking of the minimum torque position. As a variant, or additionally, the electronic control unit monitors the position of the windable element.

According to step E5, when the fabric 3 reaches the fabric replacement position P3 following the unwinding phase of step E4, the electronic control unit 9 stops the rotation of the electric motor in the fabric replacement position P3.

Stopping in the fabric replacement position P3 can be carried out after one or more iterations of movement between the end of travel low positions reached by a downward movement and the end of travel low position reached by an upward movement.

Multiple iterations during step E4 allow the minimum torque position to be refined and thus present the most suitable position to the user who wishes to change his fabric.

When the fabric replacement position P3 is reached and the electric motor is stopped, the user can easily change the fabric without dismantling the system.

Once the fabric 3 has been changed, a validation at the control interface 11 allows the user to return to the conventional operating mode, in which the high P1 and low P2 positions are maintained. In this mode, the fabric 3 is wound around the winding tube 5 so as to be positioned and displaced between the high position P1 and the low position P2.

The method for adjusting described above applies in the case of a system where the fabric 3 and the load bar 7 are suspended from the winding tube 5, irrespective of the positions P1, P2, P3 reached.

Also, the method for adjusting just described applies when the monitored parameter is representative of the position of the fabric 3 instead of the torque. To do this, the electronic control unit 9 determines the minimum value assumed by the free end of the fabric 3, in other words, the lowest position reached in the direction of unwinding of the fabric 3. This step is carried out after step E2, at the end of which the method has analyzed the variations in the positions assumed by the fabric 3, in particular the positions assumed by the free end of the fabric 3. The lowest position reached by the fabric is obtained, for example, when an optical sensor has detected that the fabric 3 is no longer wound at least partially on the winding tube 5, in other words, when the optical sensor is pointing at the bare winding tube, or by analyzing the direction of displacement of an accelerometer mounted on or in the load bar.

In the case where the opening 8 to be masked includes a horizontal ledge at its lowest edge, such as a shelf or the floor in the case of a bay window, the load bar 7 rests against this ledge when the low position P2 is reached or at least slightly exceeded in the unwinding direction.

Thus, when the load bar 7 comes to rest against the ledge and the electric motor continues its rotation in its first direction of rotation, the load bar 7 is no longer suspended relative to the winding tube 5: the torque to be supplied by the electric motor or the position of the free end of the fabric no longer changes appreciably until the load bar is again away from this ledge.

The range of positions corresponding to the minimum torque, or the lowest position is then greater than in the case where the fabric 3 and the load bar 7 are suspended from the winding tube 5.

In order to estimate the location of the fabric replacement position P3, the method for adjusting, according to the invention includes a step aimed at identifying the instant from which the load bar 7 rests on the obstacle, and the instant from which the load bar 7 is lifted from the obstacle.

The electronic control unit 9 thus monitors the position of the windable element in order to estimate the positions in which the load bar 7 will rest on the obstacle, and in which the load bar 7 is lifted off the obstacle again.

For this purpose, the system 1 of the invention is equipped with an angular position encoder and/or a time counter, used to identify these positions. The angular position encoder and/or time counter may be part of the position identification means or complementary to it.

The method for adjusting of the invention includes a step for counting the number of pulses generated by the electric motor between a first position in which the load bar 7 rests on the obstacle and a second position in which the load bar 7 is lifted off the obstacle.

The step aiming to determine the fabric replacement position P3 is then obtained by dividing the number of counted pulses by two.

As a general rule, the fabric replacement position P3 corresponds to a position halfway between the first position and the second position.

According to an arrangement of the method for adjusting according to the invention, the method includes an additional step proposing to the user, after the rotation of the electric motor has been stopped, to slightly modify the position of the fabric relative to the fabric replacement position P3 reached automatically during the implementation of the method.

This step allows the user to adapt the positioning of the fabric as a function of certain constraints of use, which in particular are:

- taking into account a preferred position of the attachment area between the fabric 3 and the winding tube 5, which can be on the front or rear of the winding tube 5,
- taking into account the presence of a box in which the winding tube 5 is mounted, and intended to protect the fabric 3 when it is wound onto the winding tube 5;
- taking into account obstacles to the replacement of the fabric which may be located on either side of the axis 17 of the winding tube 5 of the fabric 3, in particular in order to take into account the presence of a box in which the winding tube 5 is mounted and intended to protect the fabric 3 when it is wound onto the winding tube 5.

According to another arrangement of the method for adjusting according to the invention, the possible range of movement can be limited in order to avoid damage to the fabric due to the fact that stops in the low position P2 and in the fabric replacement position P3 are temporarily no longer taken into account.

To achieve this, the electronic control unit 9 controlling the electric motor of the winding tube 5 is set to stop the rotation of the electric motor when it has completed a predetermined number of turns. This number of turns may be less than one. This number of turns may be representative of a distance depending on the distance between the low position P2 and the fabric replacement position P3.

By way of example, this distance may be twice the distance between the low position P2 and the determined fabric replacement position P3.

The method for adjusting of the invention can be implemented at the time of installation of the system 1, for example when the installer identifies the high position P1 and low position P2.

Thus, the installer can, at that moment, proceed to track the fabric replacement position P3 using the method of the invention, without necessarily needing to stop in this position.

The tracking step E10 can then comprise a step for memorizing the screen replacement position P3 in the system. The electronic control unit includes a memory adapted for this purpose.

This screen replacement position P3 is then simply recalled at will by the user.

To do this, the user uses the control interface 11 to issue a command to displace, to the memorized fabric replacement position P3. For this purpose, the control interface 11 may comprise a specific fabric replacement button, or a combination of buttons on the control interface 11 may be used to move the fabric 3 to the fabric replacement position P3 previously memorized when the method of the invention was implemented.

As a variant, the method for adjusting can be implemented directly at the moment when the fabric 3 is to be replaced. In this case, steps E4 and E5 are also implemented, and it is not necessary to memorize the identified screen replacement position P3.

It goes without saying, the present invention is not limited solely to the embodiments of this method for adjusting and installation of a windable element system, described above by way of illustrative examples only, but on the contrary embraces all the variants involving the technical equivalents of the means described as well as their combinations if these fall within the scope of the invention.

The invention claimed is:

1. A method for adjusting a system, having a motorized windable element, said system comprising:

- a windable element,
- a winding tube, onto which said windable element can be wound,
- an actuator for operating the windable element, comprising an electric motor, which is movable in a first direction of rotation in which the windable element is displaced in at least one unwinding direction, and in a second direction of rotation in which the windable element is displaced in at least one winding direction,
- an electronic control unit comprising a tracking device for tracking the position of the windable element,
- the method comprising a step wherein said windable element is adjusted to a high position and to a low position located beyond said high position in the unwinding direction of the windable element, the windable element being wound at least partially around the winding tube in the low position,
- the method comprising a step wherein the tracking device tracks a single position known as a windable element replacement position, according to which the windable element is completely unwound relative to the winding tube, wherein the windable element is adjusted to the windable element replacement position.

2. The method for adjusting according to claim 1, wherein the electronic control unit comprises a determining device for determining a parameter representative of the position of the windable element and a monitoring device for monitoring a parameter representative of the torque of said electric motor, said method comprising:

- driving the electric motor in rotation in its first direction of rotation;
- analyzing the variations in at least one of the parameters when the electric motor is rotated in its first direction of rotation;
- determining, from said analysis, a minimum value for the analyzed parameter;
- tracking the position of the windable element when said minimum value of the analyzed parameter is reached, said position corresponding to said windable element replacement position.

3. The method for adjusting according to claim 2, wherein the determining device forms part of the means for tracking the position of the windable element.

4. The method for adjusting according to claim 3, wherein the step of determining the minimum value of the parameter is carried out by the electronic control unit when the latter detects, during the step of driving the electric motor in rotation in its first direction of rotation, a reduction in the parameter followed by an increase in the parameter.

5. The method for adjusting according to claim 2, wherein the parameter analyzed is the parameter representative of the torque supplied by the motor.

6. The method for adjusting according to claim 2, wherein the parameter analyzed is the parameter representative of the position.

7. The method for adjusting according to claim 2, further comprising a step of controlling the electric motor in rotation until said minimum value of the analyzed parameter is reached and a step of stopping the rotation of the electric motor when said minimum value of the analyzed parameter is reached, the step of controlling the rotation of the electric motor until the minimum value of the analyzed parameter is reached being carried out by driving the electric motor in rotation at least in its second direction of rotation.

8. The method for adjusting according to claim 7, further comprising, subsequent to the step of stopping the rotation of the electric motor when the windable element replacement position is reached, a step of proposing to the user to modify the position of the windable element relative to said windable element replacement position reached.

9. The method for adjusting according to claim 1, comprising a further step of memorizing the tracked windable element replacement position.

10. The method for adjusting according to claim 1, wherein the windable element replacement position is located beyond the low position in the unwinding direction of the windable element.

11. The method for adjusting according to claim 1, wherein the windable element includes a fabric equipped with a load bar (Hand wherein the determining device includes an angular position encoder or a time counter, the method including a step of determining, when the electric motor is driven in rotation in its first direction of rotation, a first position in which the load bar of the windable element rests on an obstacle and a second position in which said load bar is lifted from said obstacle.

12. The method for adjusting according to claim 11, further comprising steps:

counting the number of pulses generated by the angular position encoder or time counter between the first position and the second position;

tracking the windable element replacement position by dividing by two the number of pulses counted.

13. The method for adjusting according to claim 6, wherein the parameter representative of the position is a position assumed by a free end of the windable element.

14. A system having a motorized windable element, said system comprising:

a windable element, a winding tube, onto which said windable element can be wound, an actuator for operating the windable element, comprising an electric motor, movable in a first direction of rotation according to which the windable element is displaced in at least one unwinding direction, and in a second direction of rotation according to which the windable element is displaced in at least one winding direction, an electronic control unit, comprising means a tracking device for tracking the position of the windable element, said windable element being configured to be adjusted to a high position and to a low position located beyond said high position in the unwinding direction of the windable element, the windable element being wound at least partially around the winding tube in the low position, and a hardware and/or software unit, wherein the tracking device tracks the position of the windable element and determines that the windable element is adjusted to a windable element replacement position, according to which the windable element is completely unwound relative to the winding tube.

15. The system having the motorized windable element according to claim 14, wherein the electronic control unit comprises a determining device for determining a parameter representative of the position of the windable element and a monitoring device for monitoring a parameter representative of the torque of said electric motor.

16. The system having the motorized windable element according to claim 14, further comprising an angular position encoder and/or a time counter.

17. The system having a motorized windable element according to claim 15, further comprising an angular position encoder and/or a time counter.

* * * * *